United States Patent
Brünner et al.

(10) Patent No.: US 12,248,714 B2
(45) Date of Patent: Mar. 11, 2025

(54) METHOD FOR PROCESSING A PRINT JOB BY A PRINTER WITH LESS WASTE BASED ON DETERMINING WASTE AREAS ON THE SHEETS

(71) Applicant: Canon Production Printing Holding B.V., Venlo (NL)

(72) Inventors: Marvin P. Brünner, Venlo (NL); Wilhelmus J. E. G. Verhofstad, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 18/125,197

(22) Filed: Mar. 23, 2023

(65) Prior Publication Data

US 2023/0325128 A1 Oct. 12, 2023

(30) Foreign Application Priority Data

Apr. 6, 2022 (EP) .................................... 22166934

(51) Int. Cl.
  *G06F 3/12* (2006.01)
  *H04N 1/00* (2006.01)
(52) U.S. Cl.
  CPC .......... *G06F 3/1208* (2013.01); *G06F 3/1254* (2013.01); *G06F 3/1257* (2013.01)
(58) Field of Classification Search
  CPC ............ H04N 1/00167; H04N 1/00132; G06F 3/1257; G06F 3/1254; G06F 3/1218; G06F 3/1208
  USPC .............................................. 358/1.11–1.18
  See application file for complete search history.

(56) References Cited

U.S. PATENT DOCUMENTS

| | | | | |
|---|---|---|---|---|
| 2006/0231736 | A1* | 10/2006 | Matsuda | H04N 1/00639 250/208.1 |
| 2011/0149315 | A1 | 6/2011 | Yamazaki | |
| 2014/0064882 | A1* | 3/2014 | Sato | G06F 3/1205 412/19 |
| 2015/0227823 | A1* | 8/2015 | Ozawa | G06K 15/1823 358/1.15 |
| 2020/0133601 | A1* | 4/2020 | Oishi | G06F 3/1275 |
| 2020/0167102 | A1* | 5/2020 | Karlsson | G06F 3/1282 |
| 2020/0334506 | A1* | 10/2020 | Zamir | G06K 15/027 |

FOREIGN PATENT DOCUMENTS

JP 2001239731 A * 9/2001 ............. G03B 27/73

OTHER PUBLICATIONS

European Search Report, issued in Priority Application No. 22166934.4, dated Sep. 28, 2022.

\* cited by examiner

*Primary Examiner* — Chad Dickerson
(74) *Attorney, Agent, or Firm* — Birch, Stewart, Kolasch & Birch, LLP

(57) ABSTRACT

Method for a printing system for processing a print job comprising the print data and the plurality of print job settings. Automatically an area of the recording medium is established that is deemed to be removed or made invisible during the at least one finishing action by a finisher. A digital object is retrieved from memory of the printer which is used for checking and monitoring at least one characterization of the desired end product. The print data are printed and also the digital object is printed at the automatically established area.

15 Claims, 10 Drawing Sheets

METHOD FOR PROCESSING A PRINT JOB BY A PRINTER WITH LESS WASTE BASED ON DETERMINING WASTE AREAS ON THE SHEETS

FIELD OF THE INVENTION

The present invention relates to a method for a printing system for processing a print job, the printing system having a print controller for controlling a printing process and a print head for depositing marking material on a recording medium, the print job comprising print data and having a plurality of print job settings specifying a print action on the recording medium, at least one finishing action on the recording medium and a desired end product, the method comprising the step of receiving the print job comprising the print data and the plurality of print job settings.

The present invention further relates to a printing system configured to execute the method according to the invention.

Hereinafter a printing system may also be referred to as a printer. Hereinafter a finishing system may also be referred to as a finisher.

The finishing system may be used to coat, to punch, to perforate, to glue, to bind, to stitch, to staple, to laminate, to cut, to trim, to fold, to stack, to inspect print quality, etc. Therefore, the finishing system may be a stacker, an inspection unit for inspecting the print of finish quality of the print jobs, or any other finisher for post-processing sheets or stacks of sheets. The printing system and the finishing system may communicate with each other via a digital connection. The digital connection may be a dedicated connection by means of a DFD protocol, or a general connection via a customer network. In principle a network link and protocol over which the communication runs is arbitrarily implementable. The finishing system may also be an offline finishing system.

The printing system and the finishing system are devices to print and finish respectively. An input of a device is defined as a resource which is suitable to put in the device for production of a document by the device. The input may for example be a number of loose sheets, a stack of loose sheets, a number of pre-processed sheets, a number of preprinted sheets, a number of bound sheets like a booklet or a book, one or more cover sheets, a roll of media, a rigid substrate, etc.

An output of a printing or finishing system is defined as a deliverable which is output by the printing or finishing system. The output may for example be a number of at least one loose printed sheet, a stack of loose printed sheets, a number of bound sheets like a booklet or a book, one or more cover sheets, a number of finished sheets like a number of trimmed sheets, a number of cut sheets, a number of perforated sheets, a number of laminated sheets, a number of cut and stacked sheets, combinations of the here-before mentioned sheets, a roll of media, a set of rigid substrates, etc.

Hereinafter a book may be mentioned in an example as well as a booklet. A booklet may be considered a signature, while a book is more a final product.

The recording medium may be paper, plastic, metal, tiles, textile, etc.

BACKGROUND OF THE INVENTION

A printing system is known to receive a print job comprising print data, i.e. a customer document, and a plurality of print settings and finishing settings. The printing system may be provided with a user interface suitable for input, editing, print or removal of print data and/or other printable digital objects.

Printing quality control is often an extensive facet of business for professional printers. Printing quality control largely relies on standard operating procedures that depict expected software application settings and manage colour quality control. Colour often relies on many factors, including marking material like ink and toner, recording medium like paper and carton, and environmental conditions. After the standard operating procedures are formally adopted, many printers turn their attention to individualized customer service. This is likely to include tailored quality and cost packages as well as random testing of the desired end product to ensure its accuracy.

Printing quality control is very important when mass producing something such as a textbook.

In the printing industry some quality procedures are used to prevent product defects, while others work to correct them. The printing industry also maintains quality control standards that often relate to internal processes, individual projects and customer-specific needs.

Quality control in printing usually begins with a printer's standard operating procedures which measures often ensure consistent practices and colour reproduction throughout the facility. One key point often addressed in the standard operating procedures is software application settings for all workflow computers, Upgraded software versions are likely to have different default settings, such as illustrated by the Adobe® suite platform. Those differences may lead to significant changes in colour values and ultimately cause a distorted end product.

The International Color Consortium (ICC) specification, published as an International Standard in 2005, has helped to establish the standards of colour for high quality printing. This specification is a format designed to consistently move electronic data between different operating systems. In turn, flexibility is afforded to both clients and printers. To illustrate, clients are ensured their images and profiles retain colour integrity throughout the printing process, and printers can create a usable profile for multiple operating systems.

Another aspect of the standard operating procedures is likely to be colour quality control. Management of this often creates predictable and repeatable image reproductions using such devices as printers, scanners and digital cameras. Similar to the whole of printing quality control, colour management often depends upon several variables. Among these are choice of ink and paper and product exposure to light, air and heat.

Inkjet printers often use dye- or pigment-based inks. Laser printers, on the other hand, are likely to use toner. Various benefits can be gleaned from each of these, although some printers may prefer one product over the other. In many cases, such options are explained to the customer before the product is delivered.

Unlike ink, which may reflect the printer's preference, paper choice is often selected by the customer. Products with a glossy finish or added optical brighteners may react negatively to air particles and ultraviolet light. This in turn can influence long-term print quality. Some professional printers thus recommend premium archival paper intended to resist fade, moisture and wrinkles.

Product exposure to the elements may further impede printing quality control. Many companies thus encase printouts in plastic sleeves and store them in cool, dark environments. The customer is likely to receive similar instructions upon receipt of the end product. Without such measures, dyes may run and disrupt the colour balance or sharpness of the printout.

Once specific operating procedures are instituted, each printing job often needs personalized attention. Customer service is likely factored into this equation, whereby printers try to exceed the quality delivered by competitors and also meet the customer's needs.

Measurements performed before product delivery often indicate a company's use of printing quality control. The printing equipment, for example, can often test the run- and printability of intended paper. This equipment may also demonstrate the purity, strength and drying of inks.

When checking a sample printout, the presented colour may be inspected to determine consistency. If considering book quality control, page sequence can often be reviewed for accuracy. Some printing facilities establish staff committees that measure total printing quality control. Others, however, may rely on customer feedback to determine if expectations were met or if a more superior product may have been delivered.

Besides colour quality control the quality control marks may also be used for assuring other qualities than colour quality, for avoiding streaks in the printed image, for increasing a productivity of the printing system or for process control such as barcodes which are related to a database containing settings for finishing equipment.

However, to control the print quality often recording medium is wasted by printing quality control marks that requires space that is not going to be part of the end product. Often, this means that additional media—for example additional quality sheets—is used to print the quality control marks.

It is an objective of the present invention to provide an ecologically friendly method for processing a print job that needs to be finished by at least one the finishing system, i.e. post-processing system and needs to be checked for quality control without wasting additional recording medium.

Another objective is to provide a printer that is configured to perform the method according to the present invention.

SUMMARY OF THE INVENTION

The objective is achieved by the method according to the invention wherein the method comprises the steps of automatically establishing at least one area of the recording medium that is deemed to be removed or made invisible during the at least one finishing action, determining at least one digital object consisting of image pixels having image pixel values to be retrieved from memory of the print controller, which at least one digital object is intended to be used for checking and monitoring at least one characterization of the desired end product, determining pixel positions of image pixels of the print data which, when printed by means of the print action, correspond to a location in the at least one established area of the recording medium, creating first print instructions for depositing marking material on the recording medium according to the print action in order to print the print data, creating second print instructions for depositing marking material on the recording medium at the determined pixel positions according to the image pixel values of the at least one digital object, and printing the print data and the image pixels of the at least one digital object according to the first and second print instructions.

By doing so, the wasted recording medium due to the at least one finishing action like trimming, cutting, folding, etc. is used for printing the at least one digital object which is intended to be used for checking and monitoring at least one characterization of the end product.

The at least one characterization of the desired end product may relate to the print quality of the desired end product as well to at least one aspect of the entire process of printing and finishing which leads to the desired end product.

According to an embodiment the print controller of the printing system comprises an executable model of at least one finishing system capable of simulating the print action and the at least one finishing action and the step of automatically establishing the at least one area of the recording medium comprises the sub-step of deriving the location in the at least one area from a simulation of the print action and the at least one finishing action by the executable model which is fed with the print data and the plurality of print job settings. By predicting the at least one area that will be wasted anyway, the at least one area can be reliably used for printing the at least one digital object.

According to an embodiment the step of automatically establishing the at least one area of the recording medium comprises a sub-step of receiving from a pre-press software application an indication of at least the location in the at least one area of the recording medium. In the interfacing between pre-press software applications it is communicated to the printer which areas are suitable to be used. Preferably a size and a location on the recording medium is communicated. Such a communication may be achieved in different ways like by communicating an area (X, Y location and size) or using an agreed marker which is suitable to be detected by the printing system which will generate on its turn a dynamic digital object like print quality control marks.

According to an embodiment the indication comprises the location in and the size of the at least one area of the recording medium. The location in the at least one area may be determined per kind of digital object. For example, the location may be determined by the orientation of the digital object. For example, if the digital object concerns a test for nozzle failure detection of a print head of the printing system, the digital object may be positioned in the same orientation as an orientation of an array of nozzles of the print head.

According to an embodiment the location of the at least one area is indicated by a quantitative position. The quantitative position will guarantee an absolute fit in X, Y length units like μm or number of pixels related to the physical recording medium or to a digital image which is going to be printed on the recording medium. The quantitative position may also be related to another mark which is intended and/or predetermined to be printed on the recording medium like cut marks or fold lines. The quantitative position may also be related to a pre-printed image or a digital image which is predetermined to be printed on the recording medium at a fixed position like a company logo. The quantitative position may also refer to a specific structure or colour of the recording medium, for example a specific colour in a recording medium, for example a specific colour in a textile recording medium.

According to an embodiment the location in the at least one area is indicated by a qualitative position. Examples of qualitative locations are "in a top-left corner", "in a top-right corner", "in a bottom-left corner", "in a bottom-right corner", "in a centre", "in a widest part", "in a horizontal orientation", "in a vertical orientation", "in a diagonal orientation", a non-conflicting combination of the qualitative locations mentioned here-before, etc. The qualitative position is a basis for a calculation of the corresponding quantitative position by the print controller which is going to be used to print the digital object at the correct location on the recording medium.

The location in the at least one area may also be a non-conflicting combination of a quantitative position and a qualitative position.

An important requirement of the location in the at least one area is that the digital object must fit into the at least one area with respect to its size, i.e. the digital object, when placed in the at least one area, must not exceed the borders of the at least one area.

According to an embodiment the indication comprises a digital marker image, and the method comprises the steps of printing the digital marker image on the recording medium by the printing system and detecting the printed digital marker image on the recording medium by a scanner of the printing system.

According to an embodiment the print job is a duplex print job and the method comprises the step of selecting an imposition for the print job which leaves space for the at least one area on both sides of the recording medium. For example, the at least one area on both sides is at the same location such that waste is minimized. For example, the at least one area may be a trailing edge on one side which is combined with a leading edge on the other side, or in the middle of both sides, if the image contents are symmetrically positioned.

According to an embodiment the print data is a pre-imposed digital image and the step of automatically establishing the location in the at least one area of recording medium comprises a sub-step of detecting in the pre-imposed digital image the at least one area which is intended to be removed by the finishing action. A pre-imposed PDF image is assessed and processed by the printing system in such a way that the to be removed areas are defined and/or detected and used for printing the at least one digital object. Knowledge from the finishing actions and image content—like looking for images, marks, etc.—is used by the printing system for the definition and/or the detection. Also a print ticket may convey information to detect the at least one area. An at least partially automatic comparison of an initial print buyers file and a production job may be executed to detect the at least one area for printing the at least one digital object.

According to an embodiment the at least one characterization of the desired end product is at least one out of an image quality, a print quality, a density quality, a resolution quality, a lightness quality, a colour quality, a robustness quality, a contrast quality, a registration quality, production instruction data, sign off data, recording media characteristics, tracking data, a product identifier, finishing settings, coater settings, cutting settings, folding settings, trimming settings, punching settings, identification of a contact person, print buyer data, expected delivery time, quality assurance, quality inspection, processing instructions and administrative data.

According to an embodiment the at least one finishing action is at feast one finishing action out of a cut, a die-cut, a contour cut, a mount, a perforation, a trim, a punch, a crop, a cover, a mill, a glue on and a fold. For example, a glue on of an additional sheetlet over a carton sheet may result in a printed digital object according to the present invention which is not visible any more at the desired end product. For example, a location at the inside of a book cover may result in a printed digital object according to the present invention which is not visible anymore at the desired end product.

According to an embodiment the method comprises the step of calculating a cost of waste for each possible imposition of the print data and selecting an imposition for printing the print data including the image pixels of the at least one digital object, which imposition reduces the cost of waste to a minimum.

According to an embodiment the plurality of print job settings comprises a type of imposition to be performed by the printing system and the step of establishing the at least one area on the recording medium takes the type of imposition into account.

According to an embodiment the step of automatically establishing the at least one area comprises the sub-step of automatically establishing the at least one area of the recording medium that is deemed to be removed or made invisible during the at least one finishing action on both sides of the recording medium.

The present invention also relates to a printing system having a print controller and print marker which are configured to perform the steps of a method according to any one of the preceding claims.

The present invention also relates to a non-transitory software medium comprising executable program code configured to, when executed on a computer, enable the computer to perform the steps of the method according to the present invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

DETAILED DESCRIPTION OF THE EMBODIMENTS

Figure 1:
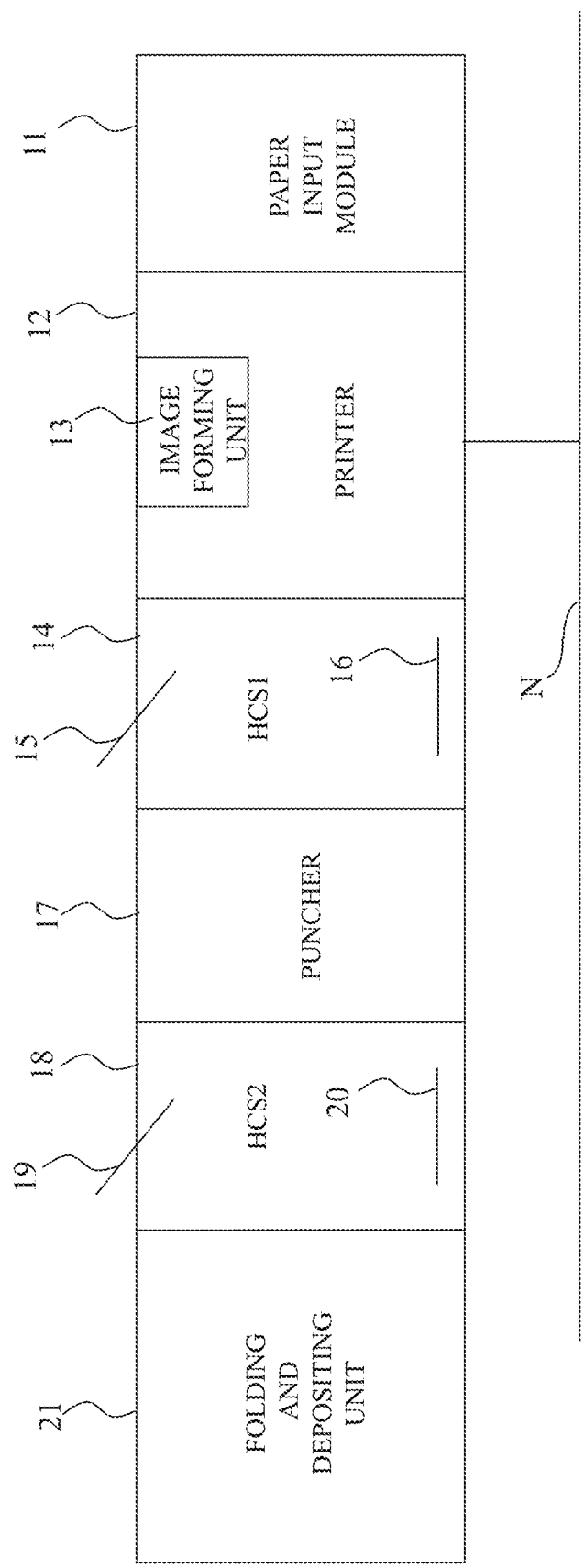
FIG. 1 shows a first schematic view of a printing system according to an embodiment of the present invention and at least one finishing system according to an embodiment the present invention.

The present invention will now be described with reference to the accompanying drawings, wherein the same or similar elements are identified with the same reference numerals throughout the several views.

FIG. 1 is an example of a simple configuration of a printing system 12 and a finishing systems 17, 21 to which the present invention can be applied. The printing system 12 is connected to a network N for receiving print jobs in memory of the print controller of the printing system 12. The printing system 12 may be provided with a scanner to scan the printed recording medium. The print controller may be configured to receive the scans and start up a correction mechanism in order to avoid a mix up of errorless sheets and erroneous sheets in an output location of the printing system 12. Recording medium needed for the print job according to the print job settings is retrieved from an paper input module 11 which is physically connected to the printing system 12. The printing system 12 comprises an image forming unit 13—also known as print marker—for marking the recording medium according to the print job settings with marking material like ink or toner in accordance with image data of the print job. The image forming unit 13 is also configured for marking the recording medium with the digital image objects to check and monitor the quality of the end product according to the present invention. The printed output of the printing system 12 may be delivered to a first physically connected high capacity stacker 14, abbreviated HCS1. The first high capacity stacker 14 comprises a first output location 16 called "HCS1 Main tray" and a second output location 15 called "HCS1 Top tray". Stacks of sheets of recording medium which arrive at the first output location 16 may be used for off-line finishing. The first high capacity stacker 14 is physically connected to a punching unit 17 for punching holes or contours in the printed recording medium. The punching unit 17 is physically connected to a second high capacity stacker 18, abbreviated HCS2. The second high capacity stacker 18 comprises a third output location 20 called "HCS2 Main tray" and a fourth output location 19 called "HCS2 Top tray". Stacks of sheets of recording medium which arrive at the third output location 20 may be used for off-line finishing. The second high capacity stacker 18 is physically connected to a folding and depositing unit 21 for folding and depositing the punched sheets.

In the example of FIG. 1 a punching unit 17 and a folding and depositing unit 21 are shown as finishing systems, but according to the present invention any other finishing device may be envisioned.

In the example of FIG. 1 the punching unit 17 and the folding and depositing unit 21 are shown as inline finishing systems, but according to the present invention also offline finishing systems may be envisioned, which are not physically coupled to the printing system 12.

Figure 2A:
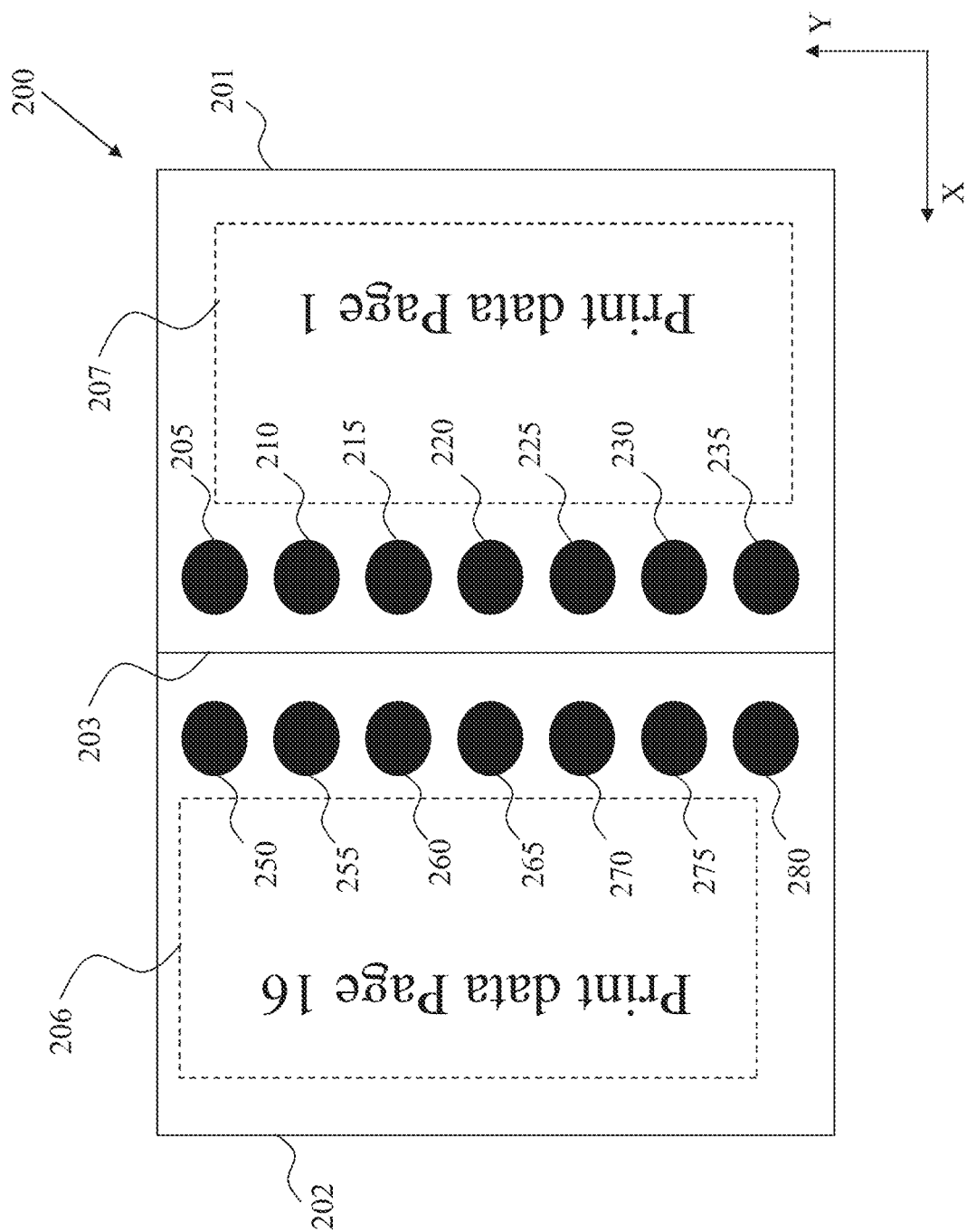
FIGS. 2A-2B show a first example of an established area of the recording medium that is deemed to be removed during a punching action.
Figure 2B:
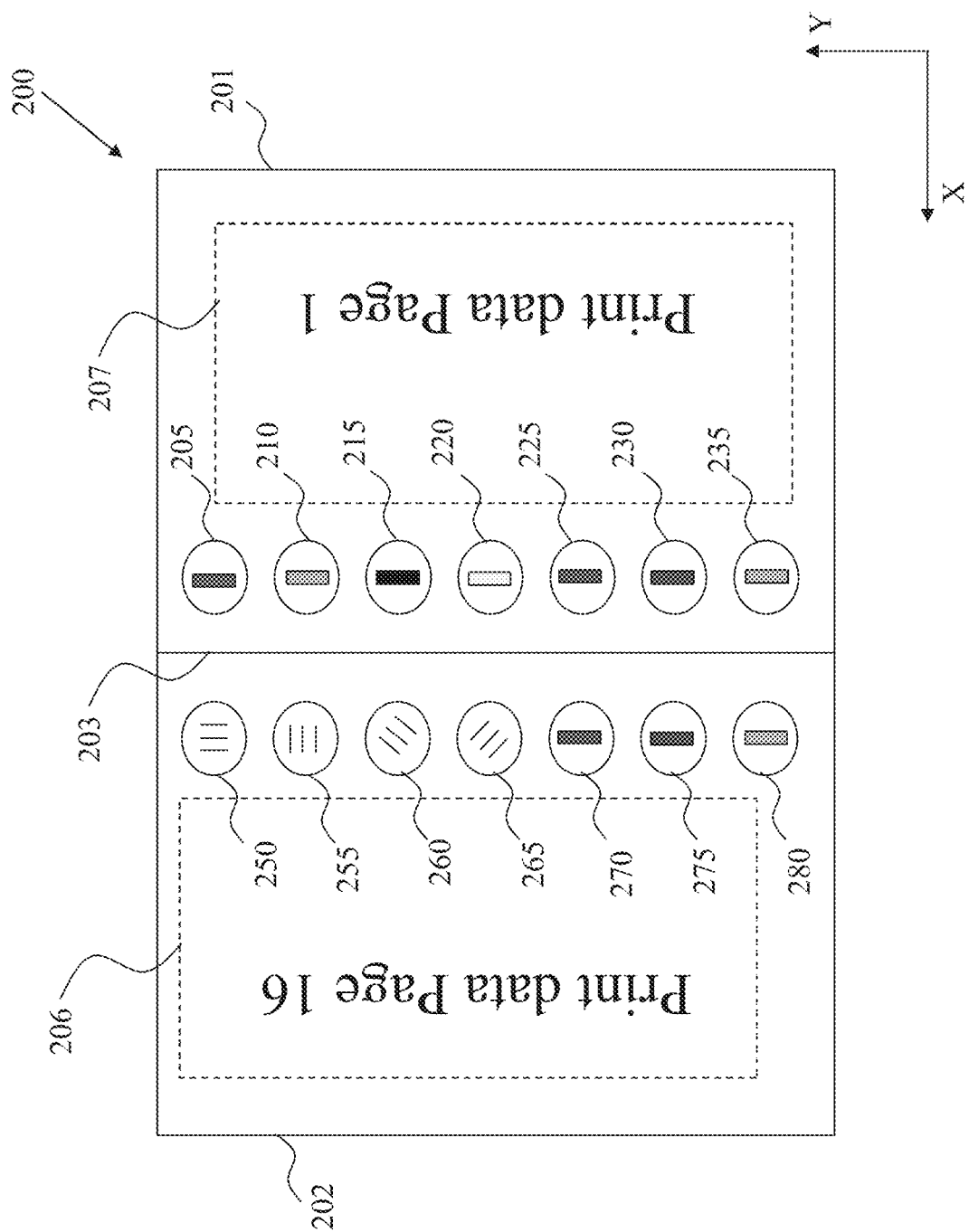

FIGS. 2A-2B show a first example of an established area of the recording medium that is deemed to be removed during a punching action.

FIG. 2A shows part of a booklet having a plurality of pages to be double-sided printed on sheets of recording medium according to print data of a document which has been received at the printing system 12 shown in FIG. 1. After printing the pages on the sheets, the sheets are delivered to the high capacity stacker 14 and punched with punch holes 205-280 by the punching unit 17 and then folded in half along a fold line 203 by the folding and depositing unit 21. In the example of FIG. 2A the booklet consist of four sheets and is printed to result in a document of 16 pages of content. However any other number of sheets may be envisioned as long as the high capacity stacker 14 and the punching unit 17 can take care of the stack of sheets.

FIG. 2A shows a spread view 200 of a leaf of two pages 201, 202 of one side of one sheet of recording medium which is going to be used for producing the booklet. A first page 201 contains print data 207 of a first page of the document to be printed. A second page 202 contains print data 206 of a sixteenth page of the document to be printed. The first page 201 will be punched with 7 holes 205, 210, 215, 220, 225, 230, 235. The second page 202 will be punched with 7 holes 250, 255, 260, 265, 270, 275, 280. Since the recording medium at the positions of the punch holes 205-280 will be removed during the punching action, the areas of the punch hole 205-280 on the recording medium are established as an area of the recording medium that is suitable for printing the digital objects for some quality control marks according to the present invention. In FIG. 2A the established areas are coloured black for convenience reasons.

FIG. 2B again shows the spread view 200 of the leaf of the two pages 201, 202, In FIG. 2B quality control marks have been placed in the established areas. In this example each of the areas 205, 210, 215, 220, 225, 230, 235 of the corresponding punch holes contains a rectangle of a different colour of marking material. By doing so, the colour quality of a certain colour of marking material may be checked as well as the condition of one or more nozzles of the image forming unit 13 of the printing system 12 from which nozzles the coloured marking material is ejected onto the sheet of the leaf of the two pages 201, 202, The colour quality check may be repeated by entering a specific colour in an area 235 on the first page 201 and in an area 280 on the second page 202. When the transport direction of the recording medium along the image forming unit 13 of the printing system 12 is assumed to be in the X direction as indicated in FIG. 2B, a timing of the firing of the nozzles from which the marking material of the specific colour is ejected can be checked by scanning the positions of the rectangles in the areas 235, 280 respectively. The scanning of the positions can be achieved by a scanner (not shown) which is placed directly after the image forming unit 13. The scanned positions can be compared with the intended positions which are determined before printing the leaf of the two pages 201, 202.

Since the punch holes are aligned vertically and equidistant, the positions of the rectangles in the areas 205, 210, 215, 220, 225, 230, 235—when printed—may be used to check a condition of the image forming unit 13 with nozzle arrays with respect to expansion or shrinkage of parts of the image forming unit 13 in the X direction as well as in the Y direction as indicated in FIG. 2B.

In the area 250 the digital quality object consists of a number of equidistant vertical lines. In the area 255 the digital quality object consists of a number of equidistant horizontal lines. In the areas 260, 265 the digital quality object consists of a number of equidistant diagonal lines. The lines in the areas 250, 255, 260, 265 may be scanned after printing the leaf of the two pages 201, 202 by the printing system 12 and may be used for registering purposes on the fly.

In general, the content of the digital object which is placed in the established areas 205-280 may vary and selectable by the user as long as the digital object does not extend beyond the borders of the established areas 205-280. Since the part of the printed recording medium which corresponds with the established areas 205-280 will be anyhow removed by the punching unit 17, there is no additional waste of the recording medium due to printing of quality control marks.

For visibility and convenience reasons the size of the punch holes 205-280 in FIG. 2A and FIG. 2B has been exaggerated.

Figure 3A:
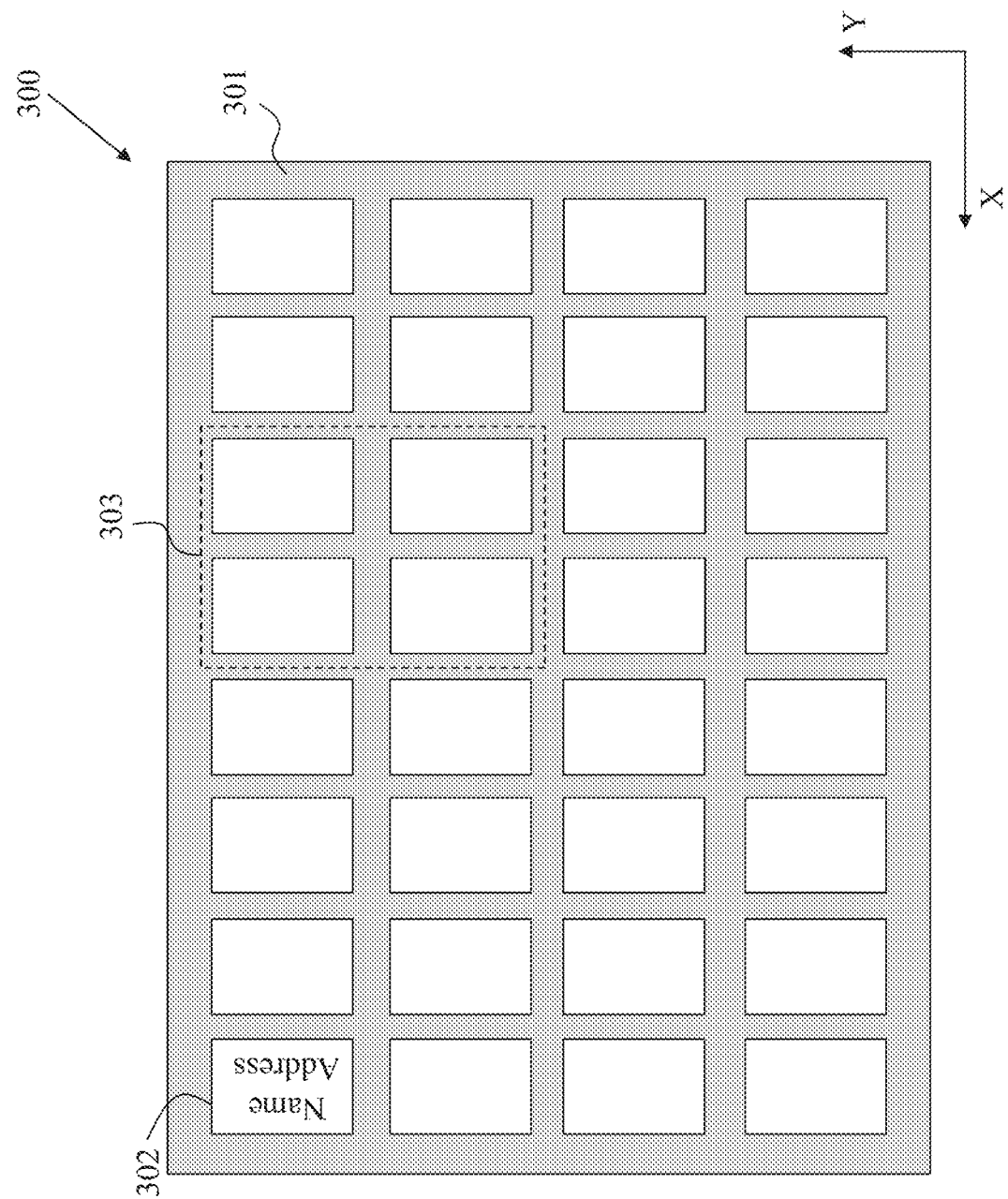
FIGS. 3A-3B show a second example of an established area of imposed images on the recording medium that is deemed to be removed during a cut finishing action.
Figure 3B:
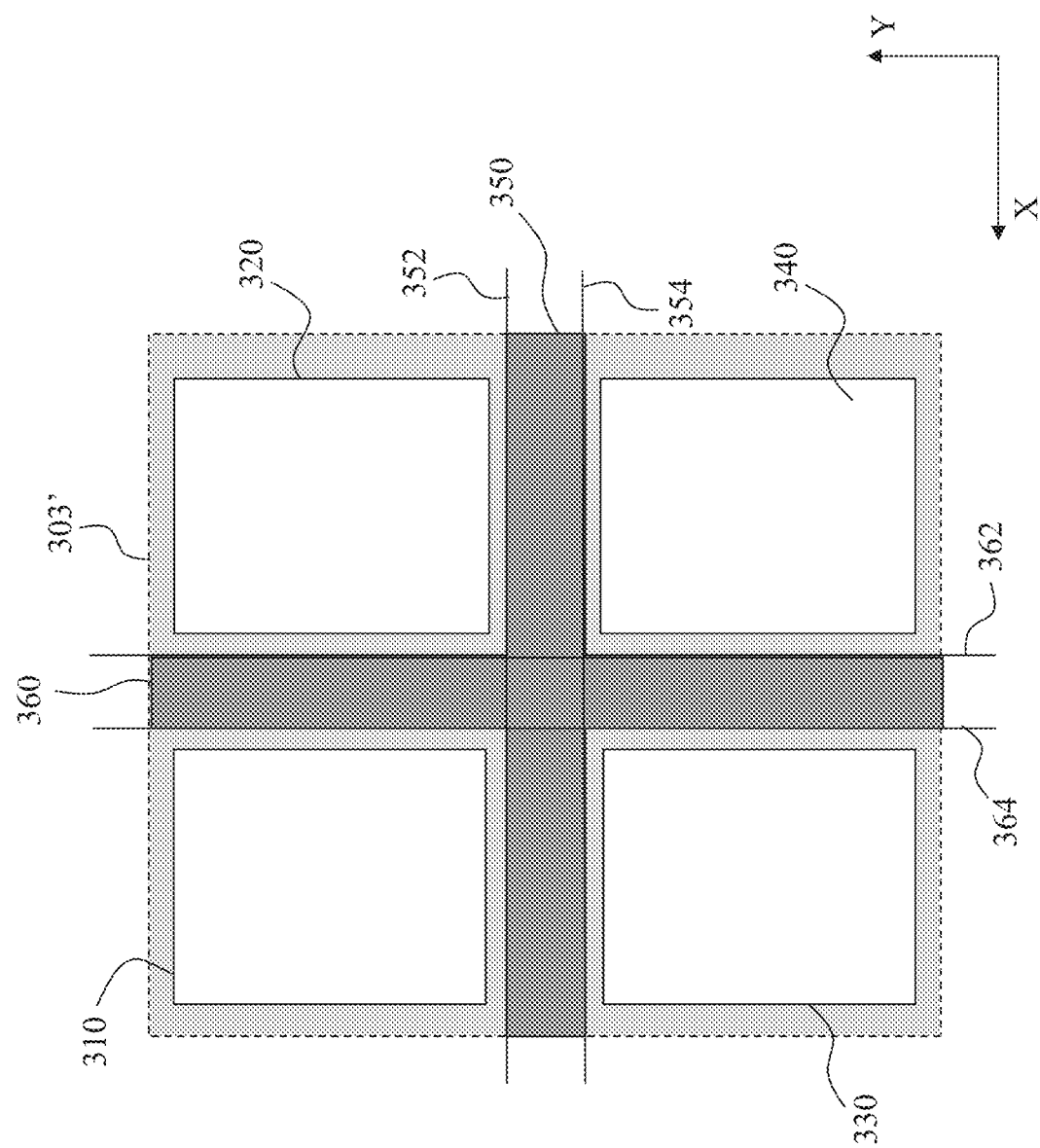

FIG. 3A 3B show a second example of an established area of imposed images on the recording medium that is deemed to be removed during a cut finishing action.

FIG. 3A shows an imposition 300 of a number of labels 302 on a sheet. In this examples there are 8×4=32 labels oriented in rows and columns in the XY plane. The labels 302 may contain names and addresses from an address book or may be used for representation cards like personal business cards. When the sheet is printed the labels 302 will be cut out by a cutting system (not shown). The grey-coloured part 301 is established to be an area which is going to be wasted due to the cutting action. A part 303 of the sheet is investigated in detail.

FIG. 3B shows an enlarged part 303' of the part 303 of the sheet shown in FIG. 3A, The labels in the enlarged part 303' occupy the rectangles 310, 320, 330, 340. The content or print data of each label may be a different name and address retrieved from an address book which is received by an involved printing system, for example printing system 12. FIG. 3B shows horizontal cut lines 352, 354 and vertical cut lines 362, 364 along which the labels are intended to be cut out of the recording medium by the cutting finishing device which is invoked after printing by the printing system 12. In this example the grey coloured areas—light grey coloured as well as dark grey coloured areas—are going to be wasted. The dark grey coloured areas 350, 360 are areas of the recording medium that are going to be wasted during the cut out finishing action and have a larger width than the light grey coloured areas. In this example the areas 350, 360 are established to be suitable for used of printing quality control marks on the recording medium. The outer light grey coloured borders of the enlarged part 303' may be suitable for printing other quality control marks which need less space.

In FIG. 3A it can be seen that the areas 350, 360 extend in a horizontal and in a vertical direction towards the edges of the sheet respectively. The quality control marks which are intended to be printed in the areas 350, 360 may also extend in a horizontal direction and a vertical direction respectively. This is advantageous, since the digital object comprising quality control marks of a longest allowable vertical and/or horizontal length may allow print quality tests for a print head having a sheet wide array of nozzles allowing a one-pass print strategy. The longest allowable vertical and/or horizontal length may in fact correspond to the height and width respectively of the sheet shown in FIG. 3A.

In general, the content of the digital object which is placed in the established areas may vary and selectable by the user as long as the digital object does not extend beyond the borders of the established areas. Since the part of the printed recording medium which corresponds with the established areas will be anyhow cut out from the recording medium by the cutting device, there is no additional waste of the recording medium due to printing of quality control marks.

Figure 4:
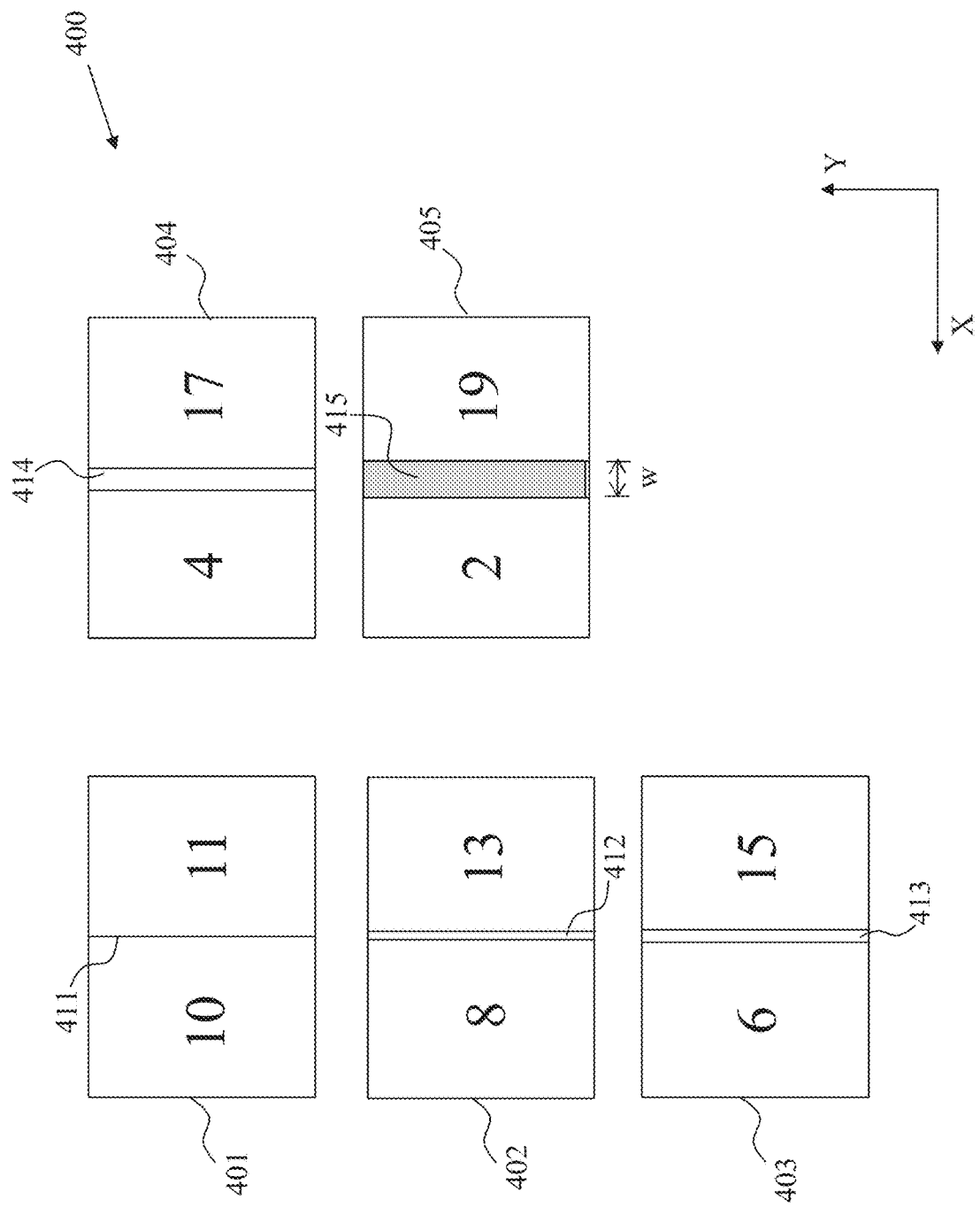
FIG. 4 shows a third example of an established area of the recording medium that is deemed to be made invisible during a book finishing action.

FIG. 4 shows a third example of an established area of the recording medium that is deemed to be made invisible during a book finishing action. A book may be bound or folded. A spine of the book is often used to include a title and an author of the book.

Each sheet of the book may contain four pages of content when the sheet is double-sided printed. For each sheet a spine area may be provided half way of the length of the sheet between the two pages on a front side of the sheet and between the two pages on a back side of the sheet.

FIG. 4 shows an example of a booklet 400 of a booklet which comprises five sheets which are going to be folded halfway and bound afterwards. The front sides 401-405 of the sheets of the booklet are shown in FIG. 4. Page numbers are schematically show on the front sides 401-405. A sheet in the middle of the book which front side 401 contains the pages numbered 10 and 11 has a fold line 411. For the sheets which are folded behind the middle sheet 401 the front sides 402-405 are provided with a spine area 412-415 respectively. Each spine area 412-415 can be established as an area of the recording medium that is made invisible during the folding and binding action. A size of the spine area increases from approximately zero—being the width of the fold line 411—in the middle of the booklet to a substantial width w of a cover of the booklet at the back side of the sheet 405. When the spine area reaches a predetermined width, a digital object for print quality control can be printed in the spine area. For example, the width w of the spine area 415 of the sheet 405 is sufficiently large to print a digital object in the grey coloured spine area 415 when the digital object has a width that is smaller than the width w and a height that is smaller than a width of the sheet 405 in the Y direction indicated in FIG. 4.

For books comprising a large number of sheets, the digital objects can be printed on a majority of the sheets of the book which facilitates a quality control for the majority of the sheets of the book. The present invention also facilitates the printing of different digital objects on the sheets of the book. When the different digital objects are suitable for different checks on the print quality more than one test result on print quality has been prepared and can be achieved after printing the book. Moreover, when a scanner is provided in the printing system 12 which is able to scan the printed sheets immediately after printing, the test results may be ready during printing the book and can be used to tune the printing system 12 in case that deviations are found in the test results.

For visibility and convenience reasons the size of the spine areas 412-415 in FIG. 4 has been exaggerated.

Figure 5A:
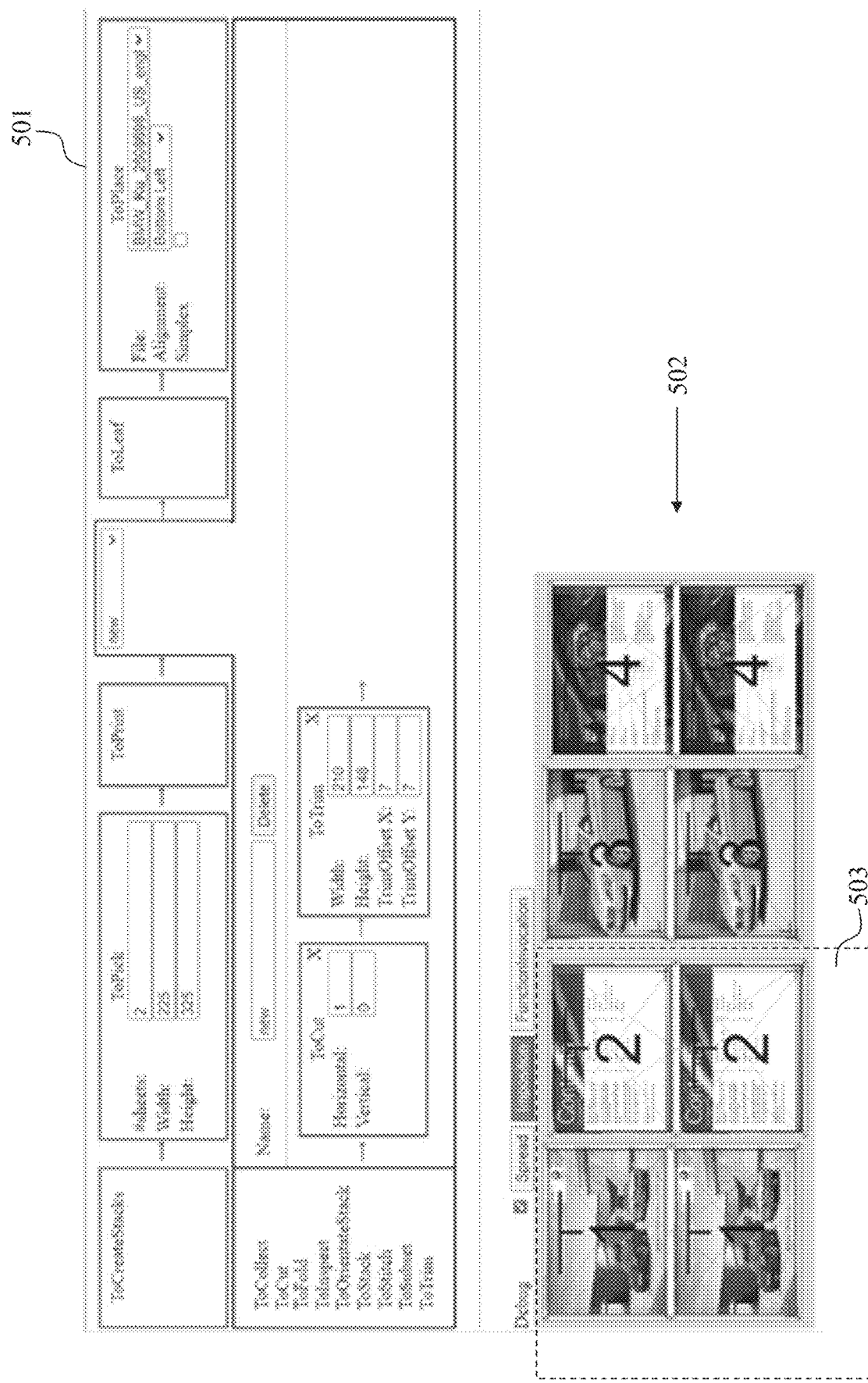
FIGS. 5A-5B elucidates a scheme of an executable model of at least one finishing system capable of simulating the print action and the at least one finishing action.

FIG. 5A elucidates a scheme of an executable model of a finishing system capable of simulating the print action and one or more finishing actions. A similar executable model is described in patent application EP 3201755. The simulation model generates a sheet assembly by means of a production route model for a kind of end product produced by a plurality of actions as shown in production process scheme 501. The consecutive actions shown in scheme 501 are respectively labelled as "ToCreateStacks", "ToPick", "ToPrint", "ToCut", "ToTrim", "ToLeaf" and "ToPlace", The action labelled "ToPrint" represents the actual printing action by the printing system 12. The actions labelled "ToCut" and "ToTrim" represent the finishing actions of cutting and trimming the sheets respectively. The generation of the sheet assembly using as input the plurality of print job settings, a representation of the sheets of recording medium and pages derived from a digital source file. The sheet assembly comprises a set of transitions that result from performing the plurality of actions wherein each transition is a modification of a value of a property of a sheet, a creation of a relationship between sheets, a termination of a relationship between sheets, a creation of a sheet, or a destruction of a sheet. From the sheet assembly a document imposition recipe 502 is extracted comprising a set of imposition descriptions generated by computing for each transition performed on the sheet assembly transformations that express a change of a coordinate system used for the transition and parameters that specify the actions related to the transition. In the document imposition recipe 502 a first leaf 503 is shown of a front side of a sheet with two times a page numbered with 1 and a back side of the sheet with two times a page numbered with 2.

Figure 5B:

FIG. 5B shows an enlargement 503' of the first leaf 503 in FIG. 5A. On the front side 610 of the sheet two images 611, 612 are positioned below each other. The images 611, 612 are indicated by a page number 1. On the back side 620 of the sheet two images are positioned below each other which are indicated by a page number 2.

Between the two images 611, 612 on the front side 610 there is a small gap 630 of space of the recording medium which will be cut out or off the recording medium by the "ToCut" action shown in FIG. 5A. The space of the small gap 630 is usable space to print a digital object according to the present invention for quality control of the end product. Also the white coloured areas surrounding the images 611, 612 other than the small gap 630 which are indicated to be trimmed off by the action "ToTrim" may be identified as usable space for printing the digital object according to the invention.

According to the present invention the production process scheme 501 shown in FIG. 5A is now extended with an action labelled "ToInspect" which is planned to be executed after the "ToPrint" action and before the "ToCut" action and the "ToTrim" action. The "ToPrint" action prints the print data of the source file received by the printing system 12, while the "ToInspect" action places the digital objects for quality control. The parameters for the "ToInspect" action are the digital object and a set of rectangles with X, Y ordinates and a size. In this example the rectangles are determined by the "ToCut" action and the "ToTrim" action, which latter finishing actions have their own parameters. The rectangles are deemed to be a projection of the cut-off and/or trimmed-off parts to the ordinates at "ToInspect". A safety margin because of cut/trim tolerances may be used to stay away from the trimmed edges, e.g. 3 mm.

The projection of the determined wasted recording medium of the sheets is used at the moment of the action "ToInspect". Adjacent waste rectangles may be joined in order to facilitate the printing of larger or more digital objects for quality control. Process steps occurring earlier in a production order are higher in z-order. The z-order means that when two digital objects are projected on the same 2D surface, one of the two digital objects gets drawn over the other one.

In the examples given in FIGS. 2A, 2B, 3A, 3B, 4, 5A, 5B the digital object to be printed in the detected waste areas is directed to a digital object for print quality control. The digital object may for example by used for a check of an image quality, a print quality, a density quality, a resolution quality, a lightness quality, a colour quality, a robustness quality, a contrast quality or a registration quality. However, a digital object having another purpose than print quality control may be envisioned to be printed. For example, the digital object may be used to contain, to encode, to convey and/or to (digitally) represent production instruction data, sign off data, a product identifier, finishing settings, coater settings, identification of a contact person, print buyer data, administrative data and/or an expected delivery time.

Figure 6:
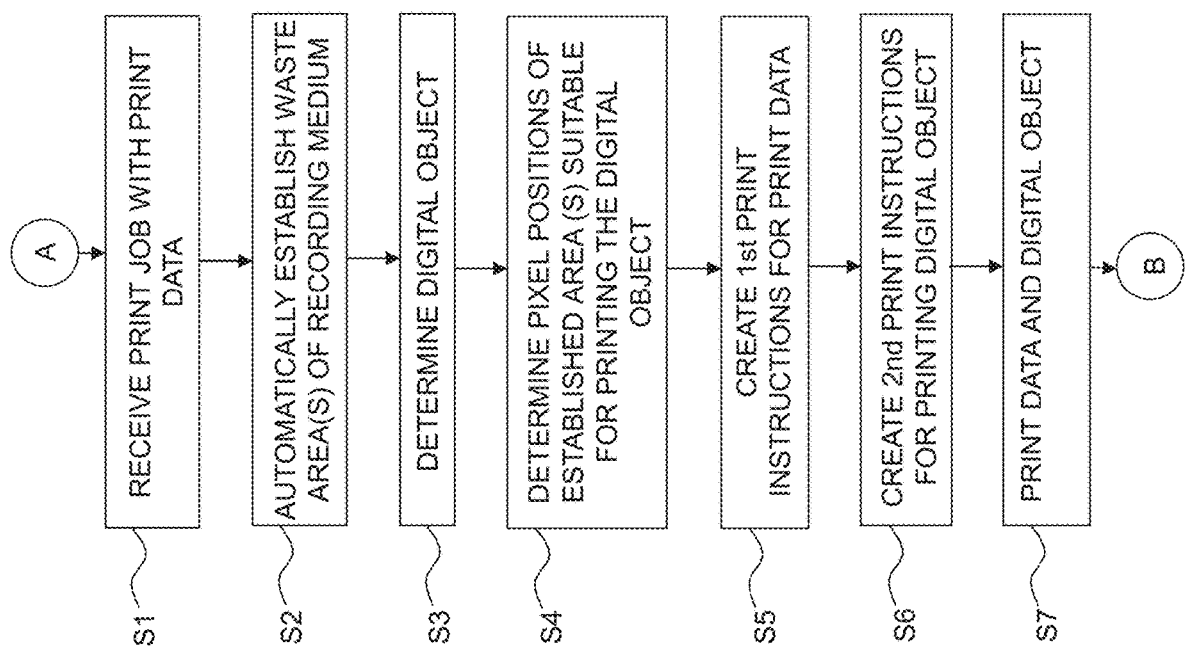
FIG. 6 is a flow diagram of an embodiment of the method according to the present invention.

FIG. 6 is a flow diagram of an embodiment of the method according to the present invention.

The method starts in a start point A which leads to a first step S1.

In the first step S1 the printing system receives the print job comprising the print data and the plurality of print job settings.

In a second step S2 at least one area of the recording medium is automatically established that is deemed to be removed or made invisible during the at least one finishing action. The at least one area may be homogeneous for all sheets of recording medium to be printed. However, according to an embodiment of the invention also areas are established which are different per sheet qua location and size.

In a third step S3 at least one digital object is determined which consists of image pixels having image pixel values to be retrieved from memory of the print controller. The at least one digital object is intended to be used for checking and monitoring at least one characterization of the desired end product.

In a fourth step S4 pixel positions of image pixels of the print data are determined which, when printed by means of the print action, correspond to a location in the at least one established area of the recording medium.

In a fifth step S5 first print instructions are created for depositing marking material on the recording medium according to the print action in order to print the print data.

Ira a sixth step S6 second print instructions are created for depositing marking material on the recording medium at the determined pixel positions according to the image pixel values of the at least one digital object.

In a final seventh step S7 the print data and the image pixels of the at least one digital object are printed according to the first and second print instructions. The printed sheet is scanned by a scanner of the printing system 12 or by visual inspection by a human operator of the printing system 12. The scan is analysed. Dependant on the result of the analysis the printed sheet may be conveyed to a stacker, to a next inline finisher or to an offline finisher, or in case of an error detection, a correction may be executed to the printing system 12 and the erroneous sheet may be conveyed to an error bin like the second output location 15 shown in FIG. 1. The latter option prevents the erroneous sheet to end up in the output stack of errorless sheets. The intended content of the sheet may be reprinted on a next sheet.

The method ends in an end point B.

Figure 7:
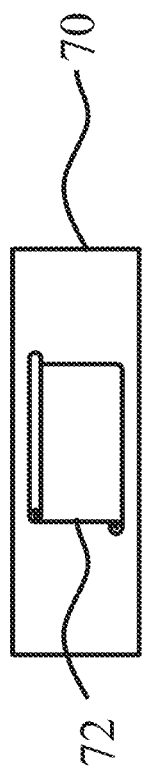
FIG. 7 schematically shows a non-transitory software medium according to the invention.

FIG. 7 schematically shows a non-transitory software medium 70 according to the invention. The software medium 70 comprises executable code 72 configured to, when executed, perform the method according to the invention, e.g. as described with respect to either the printing system 12 shown in FIG. 1 or the method of controlling the printing system 12 according to FIG. 6 or any or all of the examples in FIGS. 2A, 2B, 3A, 3B, 4, 5A, 5B and/or according to any of the variants and modifications of the printing system 12 and/or of the method described herein.

The non-transitory software medium 70 may, specifically, be formed as a CD or a CD-ROM, a DVD or a DVD-ROM, a Blu-ray disc or a Blu-ray-ROM disc, a magnetic hard drive, a solid state disk (SSD) hard drive, a USB memory device and so on.

While detailed embodiments of the present invention are disclosed herein, it is to be understood that the disclosed embodiments are merely exemplary of the invention, which can be embodied in various forms, Therefore, specific structural and functional details disclosed herein are not to be interpreted as limiting, but merely as a basis for the claims and as a representative basis for teaching one skilled in the art to variously employ the present invention in virtually any appropriately detailed structure, in particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

It will be evident that the described embodiments may be varied in many ways. All such modifications as would be evident to one skilled in the art starting from what is explicitly described are intended to be included.

The invention claimed is:

1. A method for a printing system for processing a print job, the printing system having a print controller for controlling a printing process and a print head for depositing marking material on a recording medium, the print job comprising print data and having a plurality of print job settings specifying a print action on the recording medium, at least one finishing action on the recording medium and a book, the method comprising the steps of:
    receiving the print job comprising the print data and the plurality of print job settings,
    automatically establishing a first area being a margin extending about an edge of the recording medium, a second area inside the first area and at least one area of the second area that is made not visible during the at least one finishing action and in a spine area of the book,
    determining at least one digital object comprising an image quality control mark and consisting of image pixels having image pixel values to be retrieved from memory of the print controller, which image quality control mark is intended to be used for checking and monitoring at least one characterization of the book and is printed inside the second area and is stored in memory separately from the print data of the print job,
    determining pixel positions of image pixels of the print data which, when printed by means of the print action, correspond to a location in the established at least one area of the recording medium,
    creating first print instructions for depositing marking material on the recording medium according to the print action in order to print the print data,
    creating second print instructions for depositing marking material on the recording medium at the determined pixel positions according to the image pixel values of the at least one digital object, and
    printing the print data and the image pixels of the at least one digital object on a same sheet of recording medium according to the first and second print instructions.

2. The method according to claim 1, wherein the print controller of the printing system comprises an executable model of at least one finishing system capable of simulating the print action and the at least one finishing action, and
    wherein the step of automatically establishing the at least one area of the recording medium comprises a sub-step of deriving the location in the at least one area from a simulation of the print action and the at least one finishing action by the executable model which is fed with the print data and the plurality of print job settings.

3. The method according to claim 1, wherein the step of automatically establishing the at least one area of the recording medium comprises a sub-step of receiving from a pre-press software application an indication of at least the location in the at least one area of the recording medium.

4. The method according to claim 3, wherein the indication comprises the location in and a size of the at least one area of the recording medium.

5. The method according to claim 3, wherein the indication comprises a digital marker image, and the method comprises the steps of printing the digital marker image on the recording medium by the printing system and detecting the printed digital marker image on the recording medium by a scanner of the printing system.

6. The method according to claim 1, wherein the print data is a pre-imposed digital image and the step of automatically establishing the location in the at least one area of recording medium comprises a sub-step of detecting in the pre-imposed digital image the at least one area which is intended to be made not visible by the finishing action.

7. The method according to claim 1, wherein the at least one characterization of the book is at least one out of an image quality, a print quality, a density quality, a resolution quality, a lightness quality, a colour quality, a robustness quality, a contrast quality, a registration quality, production instruction data, sign off data, a product identifier, recording media characteristics, tracking data, a product identifier, finishing settings, coater settings, cutting settings, folding settings, trimming settings, punching settings, identification of a contact person, print buyer data, expected delivery time, quality assurance, quality inspection, processing instructions and administrative data.

8. The method according to claim 1, wherein the at least one finishing action is a cover, a glue on or a fold.

9. The method according to claim 1, wherein the method comprises the step of calculating a cost of waste for each possible imposition of the print data and selecting an imposition for printing the print data including the image pixels of the at least one digital object, which imposition reduces the cost of waste to a minimum.

10. The method according to claim 1, wherein the plurality of print job settings comprises a type of imposition to be performed by the printing system and the step of establishing the at least one area on the recording medium takes the type of imposition into account.

11. The method according to claim 1, wherein the step of automatically establishing the at least one area comprises a sub-step of automatically establishing the at least one area of the recording medium that is deemed to be made not visible during the at least one finishing action on both sides of the recording medium.

12. A printing system having a print controller and print marker which are configured to perform the steps of the method according to claim 1.

13. A non-transitory software medium comprising executable program code configured to, when executed on a computer, enable the computer to perform the steps of the method according to claim 1.

14. The method according to claim 1, wherein the at least one area of the second area is part of a spine area of a sheet of the book and the method comprises the step of printing the at least one digital object on the spine area when the spine area exceeds a predetermined width.

15. The method according to claim 1, wherein the method comprises the step of printing on each of a plurality of sheets of the book a different digital object for image quality control.

* * * * *